(12) United States Patent
Sanderson et al.

(10) Patent No.: US 6,474,372 B2
(45) Date of Patent: Nov. 5, 2002

(54) WEIGHING APPARATUS

(75) Inventors: Albert Michael Sanderson, Birmingham; Eric William Loydall, Belper, both of (GB)

(73) Assignee: BMH Chronos Richardson Limited (GB)

( * ) Notice: Subject to any disclaimer, the term of this patent is extended or adjusted under 35 U.S.C. 154(b) by 0 days.

(21) Appl. No.: 09/990,404

(22) Filed: Nov. 21, 2001

(65) Prior Publication Data

US 2002/0074055 A1 Jun. 20, 2002

(30) Foreign Application Priority Data

Nov. 23, 2000 (GB) .............................. 0028599

(51) Int. Cl.$^7$ ................................. B65B 1/04
(52) U.S. Cl. ........................... 141/83; 141/104; 222/55; 177/105
(58) Field of Search ................................. 141/8, 9, 100, 141/104, 83; 222/55, 57, 58, 129, 132, 134, 135; 177/58, 59, 60, 61, 89, 105

(56) References Cited

U.S. PATENT DOCUMENTS

| | | |
|---|---|---|
| 4,313,507 A | 2/1982 | Hays |
| 5,466,894 A * | 11/1995 | Naef ........................... 141/83 |
| 5,627,346 A * | 5/1997 | Weibel et al. ................ 141/83 |
| 6,000,445 A * | 12/1999 | Schuh ........................ 141/104 |

FOREIGN PATENT DOCUMENTS

| | | |
|---|---|---|
| GB | 799483 | 8/1958 |
| GB | 902923 | 8/1962 |
| GB | 937298 | 9/1963 |
| GB | 2357588 | 6/2001 |

OTHER PUBLICATIONS

V. van der Wel, "Anwendung vom Mikroprozessoren in Dosiersteuerungen," Wagen und Dosieren, vol. 15, No. 4, pp. 153–156 (Jul. 1984).

W. Mayerhauser, "Industrielle Waege und Dosiertechnik Fuer Gemengeanlagen," Technisches Messen, vol. 58, No. 5, 196–201 (May 1, 1991).

* cited by examiner

Primary Examiner—Steven O. Douglas
(74) Attorney, Agent, or Firm—Dean W. Russell; Kilpatrick Stockton LLP

(57) ABSTRACT

The apparatus is for batching different flowable materials, e.g. "small chemicals" in the correct proportions by weight. A plurality of bulk material supply stations 14 are connected to a compact, space filling array of weighing hoppers 18 via relatively short screw 20 and/or vibratory conveyors 22. As shown, two conveyors serve each weighing 10 hopper 18. The weighing hoppers 18 are mounted upon off-centre load cells 24 and discharge into a containment cone 36 and a discharge funnel 37 for leading the weighed material batches into bagging apparatus 38.

12 Claims, 3 Drawing Sheets

WEIGHING APPARATUS

This invention concerns weighing apparatus for batches of flowable material, for example powders or granular materials, and in particular apparatus for producing batches containing predetermined proportions of various different materials by weight.

Amongst other applications, the apparatus may be used to produce pre-packaged batches of chemical additives, to be mixed into the main components of a plastics melt or rubber compound during manufacture. Such additives are known as "small chemicals". They are often supplied to polymer producers in thin plastics bags containing as many as sixteen different chemical ingredients, in the correct proportions by weight, for addition to a standard quantity of the main constituents of the polymer mix. The bags are either emptied into the main mix, or are simply dropped in whole, to be ruptured and mixed in during subsequent processing.

The small chemicals are usually weighed out manually. Each is delivered from a sack tip into a storage bin. Weighing apparatus mounted on a trolley is wheeled from bin to bin and at each a quantity of chemical is removed by hand, weighed out to the correct amount, and added to the mix for bagging. This process is labour intensive, relatively slow, requires skill, is prone to human error and may also carry health and safety implications. Apparatus is known for automatically weighing out correct quantities of the small chemicals, in which the various ingredients are fed by conveyors from bulk storage to a batch weigher and an associated bagging station. The chemicals are fed and weighed in succession. Because the number of ingredients is large, the bagging cycle times are relatively slow.

Also, if vibratory or screw feeders are used (as are particularly convenient for dispensing powders or granular materials), to avoid blockages it is best to keep the lengths of the individual conveyors as short as possible. As a rule of thumb, desirably, no conveyor should exceed 3 metres in length. Devising a compact apparatus layout that can be used to weigh and combine in batches a large number of ingredients, and which keeps the conveyor lengths acceptably short, is difficult.

In accordance with the present invention, apparatus for combining different flowable materials into batches in predetermined proportions by weight comprises a plurality of bulk material supply stations, a plurality of weighing hoppers, and a plurality of conveyors extending between the bulk material supply stations and the weighing hoppers, wherein the weighing hoppers have an upper end for receiving material from the conveyors, and a discharge end, the weighing hoppers being grouped together in close proximity, outwardly arranged side walls of the group of weighing hoppers sloping inwardly and downwardly, so that material emerging from the discharge ends is directed along convergent discharge paths, the weighing hoppers each comprising a hinged discharge door over which in the open position the material flows, thereby forming part of the convergent discharge path.

The discharge ends may direct the weighed material into a common discharge funnel, which in turn may direct the material into bagging apparatus.

For a particularly compact arrangement, the weighing hopper upper ends are preferably disposed along a substantially circular pitch line in a substantially horizontal plane. Adjacent sides of the weighing hopper upper ends preferably conform to one another to make a space-filling array. The weighing hoppers may define a central space for dust extraction.

The weighing hoppers may each be mounted upon respective off-centre load cells. There are preferably at least five weighing hoppers, for example eight arranged in an octagonal formation. Although larger numbers are possible, preferably no more than two of the conveyors discharge into a given weighing hopper. The use of multiple weighing hoppers enables weighing operations to be carried out for different ingredients simultaneously, so minimising cycle times. The use of more than one conveyor to each weighing hopper correspondingly multiplies the number of ingredients that can be weighed out in each batch. The conveyors may be screw, vibratory, or of any other suitable kind, and are desirably less than 3 metres in length. When very accurate proportioning is required, each ingredient supplied is fed and weighed in each bagging cycle. To decrease average bagging cycle times, by eliminating the need for successive ingredient feeding in a given cycle, as well as eliminating the time taken for weight measurements to settle and for weighing hoppers to discharge, weight measurements need not be taken during every bagging cycle. During each bagging cycle, the conveyors are operated for timed periods calculated on the basis of the previous weight measurements, so that these converge to target values.

The bulk material supply stations are conveniently positioned above and outwardly of the weighing hoppers. Adjacent pairs of bulk material supply stations may be connected to a given weighing hopper by the conveyors. These pairs of supply stations may be arranged around the sides of a rectangle surrounding the weighing hoppers.

The invention, including these and other preferred features, is further described below with reference to an illustrative embodiment shown in the drawings, in which.

Figure 1:
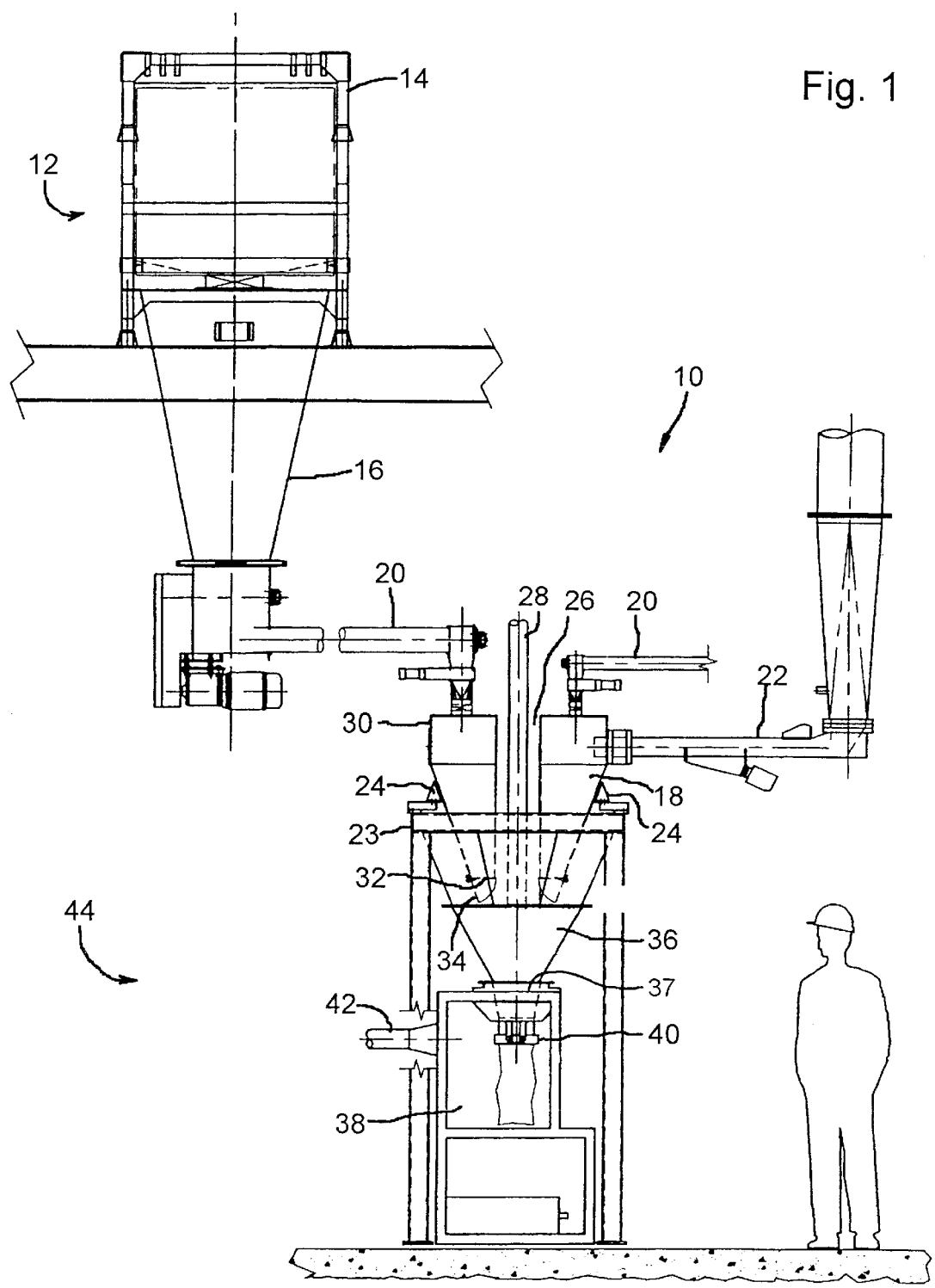
FIG. 1 is a schematic side elevation showing small chemical batch weighing apparatus embodying the invention.

The apparatus 10 has an upper level 12 on which are situated sixteen material supply stations including sack tips or bulk bag discharge units (e.g. flexible intermediate bulk container (FIBC), "big bag" discharge units) 14, for the supply of the chemicals to be weighed into correctly proportioned batches. The supply stations (only one of which is shown in FIG. 1) further include discharge chutes 16. Chemical from each discharge chute 16 is fed to a respective weighing hopper 18 by a screw feeder 20 or a vibratory feeder 22, whichever is best suited to the flow characteristics of the chemical concerned. Suitable conveyors are, for example, model nos. EM 100/M15/M25 vibratory feeders available from Applied Vibration Ltd. of 6 & 7 Sandy Way, Amington Industrial Estate, Tamworth, Staffordshire B77 4DS, United Kingdom; or variable speed screw feeders of various diameters, available from the Applicants.

Figure 2:
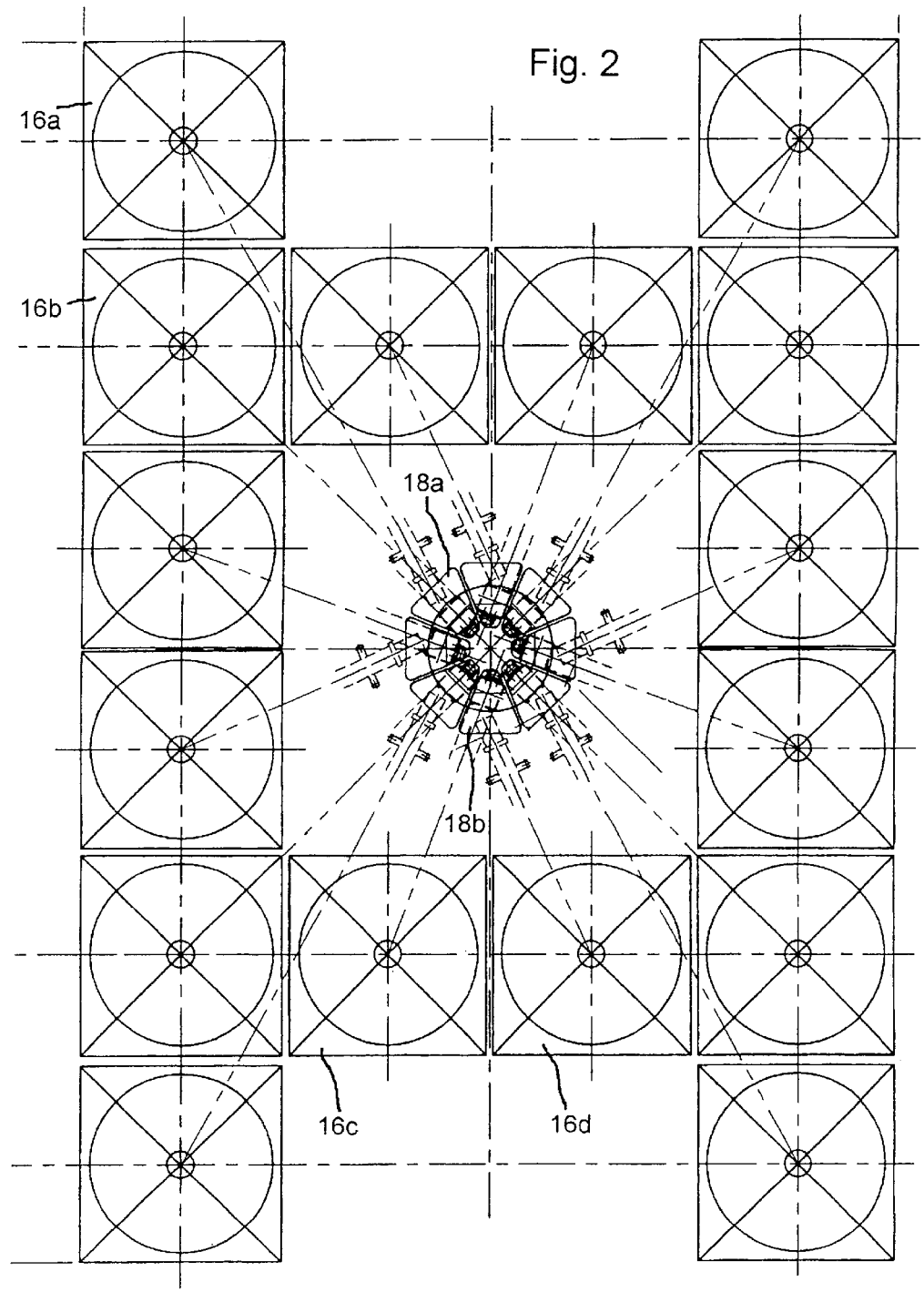
FIG. 2 is a schematic plan view of the apparatus of FIG. 1.
Figure 3:
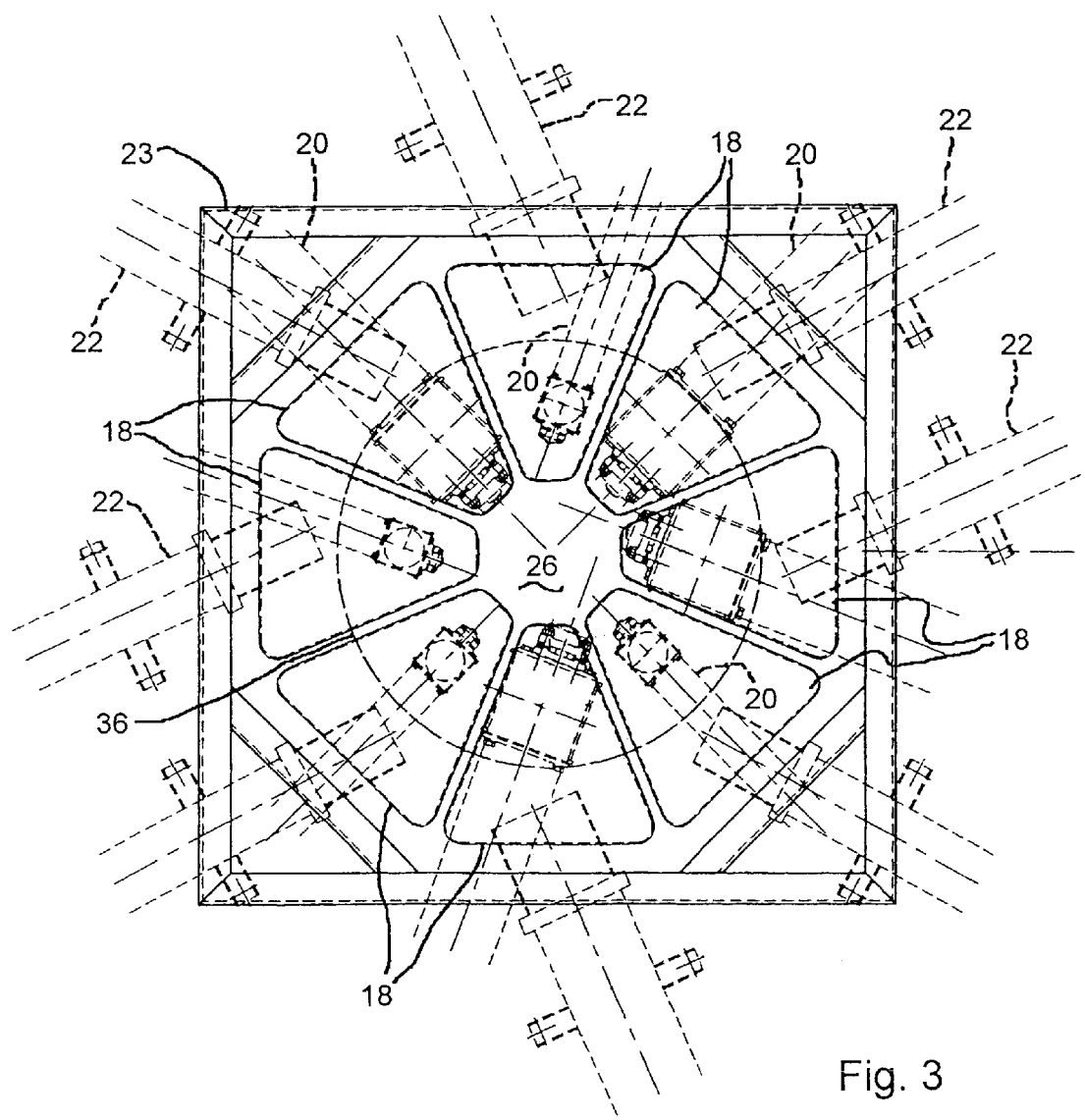
FIG. 3 is a plan view showing the weighing hoppers in more detail.

There are eight weighing hoppers 18, as more clearly shown in FIGS. 2 and 3. They are each supported on a framework 23 via an off-centre load cell 24 and are grouped around a circular pitch line. The load cell is for example a model no. 1040, available from Tedea-Huntleigh Europe Ltd of 310–312 Dallow Road, Luton, Bedfordshire LU1 1TD, United Kingdom. Each weighing hopper 18 has a generally trapezoidal horizontal cross-section, with the sides of adjacent weighing hoppers conforming to each other to form a compact, space filling array. Inner sides of the weighing hoppers 18 define a central, vertical passageway 26 through which extends a dust extraction conduit 28. The horizontal cross-sectional shape of each weighing hopper tapers from a relatively wide upper inlet end 30, to a relatively narrow discharge end 32, to provide downwardly and inwardly sloping outer walls. Two conveyors, e.g. a screw conveyor 20 and a vibratory conveyor 22 serve each weighing hopper 18, feeding chemicals from adjacent supply stations to it. For example, adjacent discharge chutes 16a, 16b (FIG. 2) supply weighing hopper 18a. Similarly, discharge chutes 16c, 16d supply weighing hopper 18b. The other material supply stations shown in FIG. 2 are similarly linked in adjacent pairs to corresponding weighing hoppers 18, by conveyors 20, 22. As shown in FIG. 1, the conveyors 20 enter horizontal top panels of the weighing hoppers 18, whereas the conveyors 22 enter the weighing hoppers at a slightly lower level, via a vertical side panel near the top of each weighing hopper.

The discharge end 32 of each weighing hopper 18 has a hinged closure flap 34 movable between a horizontal, closed position and an open-position in which it is aligned with the adjacent sloping outer wall of the weighing hopper 18. Such movement is by means of suitable pneumatic or similar actuators, in timed relation to operation of the conveyors 20, 22 for delivery of batches of chemicals with each ingredient conforming to a desired target weight.

Where accurate proportioning of weights is desired, each ingredient is weighed in each bagging cycle. Where a weighing hopper is served by two (or possibly more) conveyors, this will involve operation of the conveyors concerned in succession, each followed by an idle period to allow the weight measurement to settle, followed by a further period to allow the weighing hopper to empty, once its discharge door is opened. All of this can lead to a relatively long bagging cycle time.

Where less accurate proportioning is acceptable, weight measurements need not be taken in every bagging cycle. In each bagging cycle, including those in which weight measurements are taken, the conveyor drives are operated for timed periods, calculated in accordance with the previous weight measurement, or a series of previous measurements, so that a quantity of material conforming to a desired target weight is delivered. The calculated operation time makes allowance for material in flight and material "dribbling" after the conveyor power is shut off. The conveyors may be driven at an initial fast feed rate, followed by a trickle rate, as is conventional to achieve accurate approximation to the target weight in the minimum time. In those bagging cycles in which no weight measurements are taken, all the conveyors, including those serving the same, weighing hopper, can be operated simultaneously. Also, there is no need for time delays to allow weight measurements to settle, or time delays for opening and closing of the weighing hopper discharge door and emptying of the weighing hopper. Although perhaps less accurate, this method therefore has the advantage of faster cycle times. The apparatus can for example be operated with weighments taking place for each of the first few bagging cycles, followed by periodic weighments once acceptable convergence to the target weights has been achieved. The weights of the individual ingredients fed into the bag are typically in the range 50 g–15 kg.

The convergent weighing hopper outer walls, and the continuation of them formed by the open weighing hopper door 34, direct the material falling from the weighing hopper along a discharge path. The discharge paths from the various weighing hoppers all converge towards one another, that is, towards the central axis of the group of weighing hoppers. A containment cone 36 is placed below the weighing hoppers 18. The weighed components of each chemical batch discharged through the weighing hopper doors 34 shoot through the containment cone 36, substantially without touching its sides. The containment cone 36 serves mainly to prevent dust escaping into the surroundings. The open lower end of the containment cone 36 leads each weighed batch into a discharge funnel 37 connected to suitable bagging apparatus 38, which may include manual or automatic bag placing and clamping arms 40. The apparatus 38 further includes a dust extraction conduit 42.

As shown in FIG. 1, the conveyors 20, 22, weighing hoppers 18, containment cone 36 and bagging apparatus 38 are all arranged on a lower level 44, below the upper level 12 for the material supply stations. The apparatus as shown may therefore be used to prepare batches of small chemicals, correctly proportioned by weight, and containing up to sixteen different ingredients.

The numbers of material supply stations and weighing hoppers, as well as the number of conveyors serving each weighing hopper, may be varied as desired, to suit other batch formulation requirements. Despite the large number of ingredients catered for, the apparatus is relatively compact, and is reliable in operation, since no conveyor exceeds the desired maximum length of 3 metres.

What is claimed is:

1. Apparatus for combining different flowable materials into batches in predetermined proportions by weight comprising a plurality of bulk material supply stations, a plurality of weighing hoppers, and a plurality of conveyors extending between the bulk material supply stations and the weighing hoppers, wherein the weighing hoppers have an upper end for receiving material from the conveyors, and a discharge end, the weighing hoppers being grouped together in close proximity, outwardly arranged side walls of the group of weighing hoppers sloping inwardly and downwardly, so that material emerging from the discharge ends is directed along convergent discharge paths, the weighing hoppers each comprising a hinged discharge door over which in the open position the material flows thereby forming part of the convergent discharge path.

2. Apparatus as defined in claim 1 in which the discharge ends direct the weighed material into a common discharge funnel, which in turn directs the material into bagging apparatus.

3. Apparatus as defined in claim 1 in which the weighing hopper upper ends are disposed along a substantially circular pitch line in a substantially horizontal plane.

4. Apparatus as defined in claim 1 in which adjacent sides of the weighing hopper upper ends conform to one another to make a space-filling array.

5. Apparatus as defined in claim 1 in which the weighing hoppers define a central space for dust extraction.

6. Apparatus as defined in claim 1 in which the weighing hoppers are each mounted upon respective single off-centre load cells.

7. Apparatus as defined in claim 1 in which there are at least five weighing hoppers.

8. Apparatus as defined in claim 1 in which two or more of the conveyors discharge into a given weighing hopper.

9. Apparatus as defined in claim 1 in which the conveyors are less than three metres in length.

10. Apparatus as defined in claim 1 in which the bulk material supply stations are positioned above and outwardly of the weighing hoppers.

11. Apparatus as defined in claim 1 in which adjacent pairs of the bulk material supply stations are connected to a given weighing hopper by the conveyors.

12. Apparatus as defined in claim 11 in which the pairs of supply stations are arranged round the sides of a rectangle surrounding the weighing hoppers.

* * * * *